(12) United States Patent
Stock, Jr.

(10) Patent No.: US 7,665,779 B2
(45) Date of Patent: *Feb. 23, 2010

(54) VEHICLE ARRESTING APPARATUS

(76) Inventor: Leonard Charles Stock, Jr., 22310 N. 89th Ave., Peoria, AZ (US) 85383

(*) Notice: Subject to any disclaimer, the term of this patent is extended or adjusted under 35 U.S.C. 154(b) by 0 days.

This patent is subject to a terminal disclaimer.

(21) Appl. No.: 12/263,599

(22) Filed: Nov. 3, 2008

(65) Prior Publication Data

US 2009/0127876 A1    May 21, 2009

Related U.S. Application Data

(63) Continuation of application No. 11/360,227, filed on Feb. 23, 2006, now Pat. No. 7,452,015.

(51) Int. Cl.
*B60R 19/48* (2006.01)
(52) U.S. Cl. .................. 293/118; 293/117; 293/116; 180/271
(58) Field of Classification Search ........... 296/187.01, 296/187.03, 187.09, 187.1; 293/116–119, 293/108; 404/6; 180/271, 274, 287
See application file for complete search history.

(56) References Cited

U.S. PATENT DOCUMENTS

| | | | | |
|---|---|---|---|---|
| 5,611,408 A * | 3/1997 | Abukhader | ............ | 180/287 |
| 5,839,759 A * | 11/1998 | Trigo | ............ | 280/762 |
| 5,839,849 A * | 11/1998 | Pacholok et al. | ............ | 404/6 |
| 5,871,300 A * | 2/1999 | Ingham | ............ | 404/6 |
| 5,921,704 A * | 7/1999 | Pacholok et al. | ............ | 404/6 |
| 6,176,519 B1 * | 1/2001 | Limingoja | ............ | 280/762 |
| 6,206,608 B1 * | 3/2001 | Blevins | ............ | 404/6 |
| 6,527,475 B1 * | 3/2003 | Lowrie | ............ | 404/6 |
| 6,623,205 B1 * | 9/2003 | Ramirez | ............ | 404/6 |
| 6,758,628 B1 * | 7/2004 | Curry, Jr. | ............ | 404/6 |
| 7,220,076 B2 * | 5/2007 | Boll | ............ | 404/6 |
| 7,226,238 B2 * | 6/2007 | Collier | ............ | 404/6 |
| 7,275,889 B1 * | 10/2007 | McGill | ............ | 404/6 |
| 7,452,015 B1 * | 11/2008 | Stock, Jr. | ............ | 293/118 |

* cited by examiner

*Primary Examiner*—Glenn Dayoan
*Assistant Examiner*—Gregory Blankenship
(74) *Attorney, Agent, or Firm*—Parsons & Goltry; Michael W. Goltry; Robert A. Parsons (57) ABSTRACT

A vehicle has a forward end fashioned with a vehicle arresting device. The vehicle arresting device includes an elongate flexible member carried by opposed first and second supports having first and second outer ends, respectively. The first and second supports are mounted to the vehicle together for movement between stored and deployed positions relative to the forward end of the vehicle. The first and second outer ends of the first and second supports are disposed forwardly of the forward end of the vehicle in spaced apart relation in the deployed position of the first and second supports suspending the elongate flexible member therebetween.

13 Claims, 11 Drawing Sheets

VEHICLE ARRESTING APPARATUS

BACKGROUND OF THE INVENTION

1. Field of the Invention

The present invention relates to vehicles arresting devices and methods.

2. Related Art and Prior Art Statement

Research into the realm of police pursuits is fraught with many complex, often conflicting methodologies and ending results. Some projects indicate that police pursuits are highly dangerous and in need of better supervisory and administrative control, while others maintain that pursuits are not unduly dangerous and constitute an integral and necessary component of police duties. Struggling to come to terms with the many intricate scholarly research endeavors in this area, along with the variety of legal discussions so often occurring as a result of a pursuit gone awry, is the police administrator. Ultimately, it remains the responsibility of the policy writers and administrators to devise effective and efficient policy with regard to police vehicular pursuits. Only through improving written policy will negative outcomes of police pursuits such as accidents, injuries, fatalities, and litigation wane.

Regardless of the policy, legal, and intellectual considerations of police pursuits, every year as many as 400 people are killed during vehicular police pursuits in the United States. Many of those killed during vehicular police pursuits are simply innocent bystanders, such as pedestrians and drivers and passengers of other vehicles not involved in the pursuit. If the number of needless injuries and fatalities that occur during vehicular police pursuits are to be reduced, police vehicles must be equipped with vehicle arresting devices capable of easily and efficiently arresting pursued vehicles before the pursuit gets out of control or results needless death or serious injury. Although skilled artisans have directed considerable attention and resources toward vehicle arresting devices, the art suffers in that most are difficult to construct, difficult to install onto police cruisers, impracticable, expensive, and, most importantly, unsafe. Given these and other deficiencies in the art, the need for continued improvement in the art of vehicle arresting devices is evident.

SUMMARY OF THE INVENTION

It is an object of the invention to provide a vehicle incorporating a vehicle arresting device including an elongate flexible member carried opposed supports which low in cost, which is safe, which is easy to use, in which the supports are movable between stored and deployed positions relative to the vehicle, in which the elongate flexible member is suspended between opposed outer ends of the supports in the deployed position thereof, and which is useful in efficiently and quickly arresting pursued vehicles before the pursuit of the pursued vehicle gets out of control or results in needless injury or death of either the driver of the pursued vehicle or innocent bystanders or drivers and/or passengers of other vehicles.

According to the invention, there is provided a vehicle having an end, and an elongate flexible member carried by opposed first and second supports having first and second outer ends, respectively, in which the first and second supports are together mounted to the vehicle for movement between stored and deployed positions relative to the end of the vehicle. The first and second outer ends of the first and second supports disposed forwardly of the end of the vehicle in spaced apart relation in the deployed position of the first and second supports suspending the elongate flexible member therebetween. The elongate flexible member between the first and second outer ends of the first and second supports carries tire-piercing elements. A first motor is operatively coupled to the first support for moving the first support between its stored and deployed positions, and a second motor is operatively coupled to the second support for moving the second support between its stored and deployed positions. The first and second supports are each movable between shortened and lengthened conditions for moving the elongate flexible member suspended between the first and second outer ends of the first and second supports in the deployed position thereof in reciprocal directions relative to the end of the vehicle. In a particular embodiment, the elongate flexible member extends to, and is wound about, a spool attached to the vehicle, in which the elongate flexible member unwinds relative to the spool in response to a pulling force applied to the elongate flexible member suspended between the opposing first and second outer ends of the first and second supports in the deployed position thereof. In another embodiment, the elongate flexible member is releasably attached to one of the first and second outer ends of the first and second supports. A plurality of bumper elements are attached to the first and second supports, which cooperate to form opposed bumpers projecting forwardly of the vehicle and the first and second supports in the stored position of the first and second supports. The vehicle has a chassis and there is a base affixed to the chassis, and the first and second supports are attached to the base.

According to the invention, there is provided a vehicle having an end, first and second supports attached to the vehicle, the first end second supports extending forwardly of the end of the vehicle terminating with first and second outer ends, respectively, disposed in spaced apart relation, and an elongate flexible member suspended by and between the first and second outer ends of the first and second supports, respectively. The first and second supports are movable between shortened and lengthened conditions, respectively, for moving the elongate flexible member suspended between the first and second outer ends of the first and second supports in reciprocal directions relative to the end of the vehicle. The elongate flexible member between the first and second outer ends of the first and second supports carries tire-piercing elements. In a particular embodiment, the elongate flexible member extends to, and is wound about, a spool attached to the vehicle, the elongate flexible member winding and unwinding relative to the spool in response to movement of the first and second supports between their shortened and lengthened conditions. In yet another embodiment, the elongate flexible member is releasably attached to one of the first and second outer ends of the first and second supports. The vehicle has a chassis and there is a base affixed to the chassis, and the first and second supports are attached to the base.

According to the invention, there is provided a vehicle having opposed first and second sides, and a forward end. A base is attached to the forward end of the vehicle. The base has a first end disposed adjacent to the first side of the vehicle, and a second end disposed adjacent to the second side of the vehicle. An elongate flexible member is carried by opposed first and second supports having first and second outer ends, respectively. The first and second supports are mounted to the base at the first and second ends thereof, respectively, the first and second supports together movable between stored and deployed positions relative to the base. The first and second outer ends of the first and second supports are disposed forwardly of the base and the forward end of the vehicle in spaced apart relation in the deployed position of the first and second supports suspending the elongate flexible member therebetween. The elongate flexible member between the first and second outer ends of the first and second supports carries tire-piercing elements. In a particular embodiment, the elongate flexible member is releasably attached to one of the first and second outer ends of the first and second supports. A first motor is carried by the first end of the base and is operatively coupled to the first support for moving the first support between its stored and deployed positions. A second motor is carried by the second end of the base and is operatively coupled to the second support for moving the second support between its stored and deployed positions. The first and second supports are each movable between shortened and lengthened conditions for moving the elongate flexible member suspended between the first and second outer ends of the first and second supports in the deployed position thereof in reciprocal directions relative to the end of the vehicle. In a particular embodiment, the elongate flexible member extends to, and is wound about, a spool attached to the base between the first and second ends thereof, the elongate flexible member unwinding relative to the spool in response to a pulling force applied to the elongate flexible member suspended between the opposing first and second outer ends of the first and second supports in the deployed position thereof, and winding and unwinding relative to the spool in response to movement of the first and second supports between their shortened and lengthened conditions.

Consistent with the foregoing summary of preferred embodiments, and the ensuing detailed description, which are to be taken together, the invention also contemplates associated embodiments.

BRIEF DESCRIPTION OF THE DRAWINGS

Referring to the drawings.

DETAILED DESCRIPTION OF PREFERRED EMBODIMENTS

Figure 1:
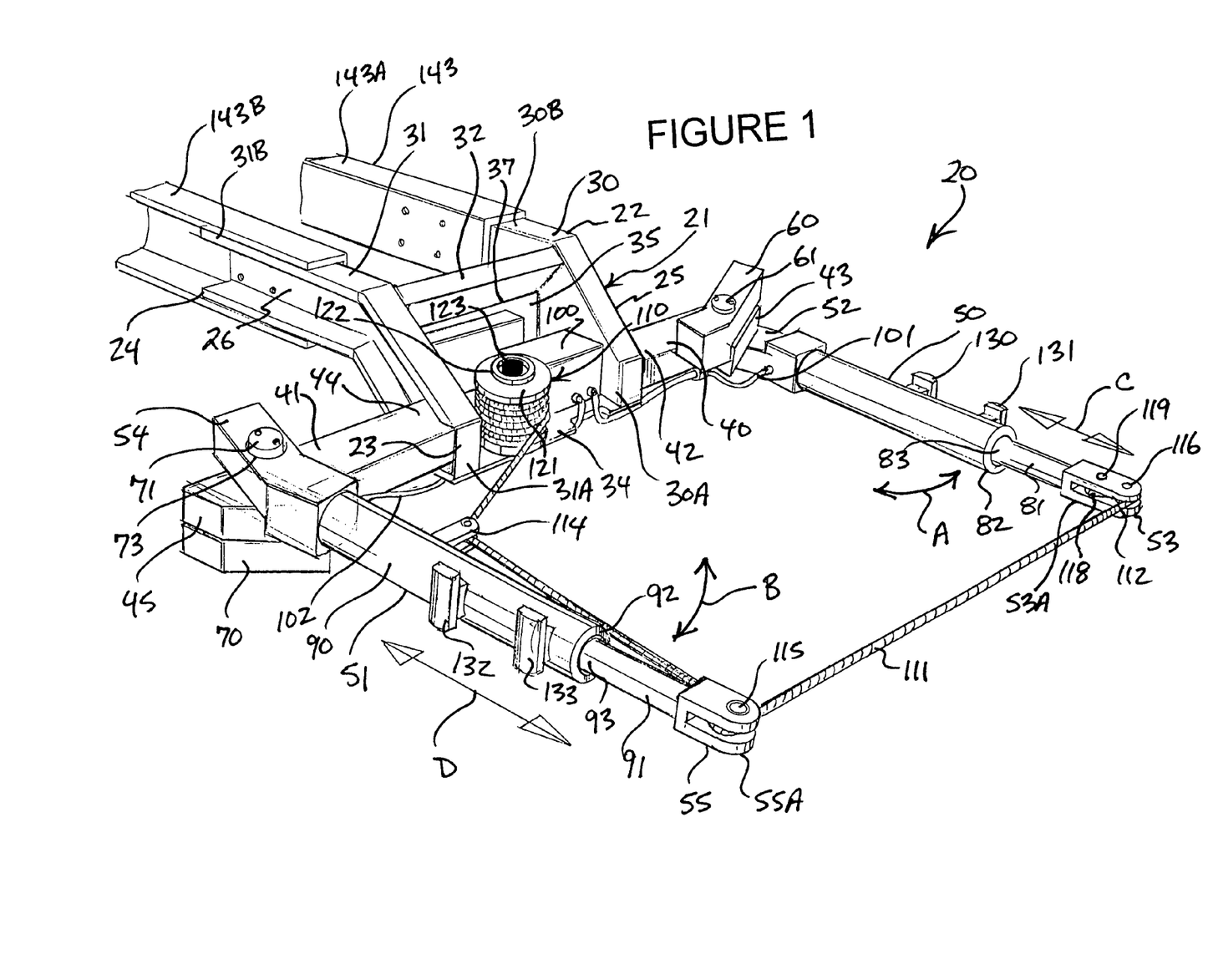
FIG. 1 is a perspective view of a vehicle arresting device constructed and arranged in accordance with the principle of the invention including a base supporting a spool having wound thereabout a cable which extends to, and is supported by, opposed left and right side supports attached to the base shown as they would appear open suspending therebetween a length of the cable.

Turning now to the drawings, in which like reference characters indicate corresponding elements throughout the several views, attention is first directed to FIG. 1 in which there is seen a vehicle arresting device 20 consisting of a base 21, which is fashioned of steel, aluminum, titanium, or other substantially rigid material or combination of materials. The various components of base 21 are rigidly affixed together with welding, nut-and-bolt assemblies, rivets, etc., with welding being preferred. Base 21 includes a fixture 22 having opposed upstream and downstream ends 23 and 24, and opposed left and right sides 25 and 26. Fixture 22 consists of opposed, substantially parallel elongate beams 30 and 31 having front ends 30A and 31A, respectively, at upstream end 23 of fixture 22, and opposing rear ends 30B and 31B, respectively, at downstream end 24 of fixture 22. Beam 30 is considered the left side beam of fixture 22 forming left side 25 of fixture 22, and beam 31 is considered the right side beam member of fixture 22 forming right side 26 of fixture 22. An intermediate transverse beam 32 joins beams 30 and 31 at a generally intermediate position between upstream and downstream ends 23 and 24 of fixture 22. The opposed ends of transverse beam 32 are rigidly affixed to beams 30 and 31, respectively.

Front ends 30A and 31A are angled downwardly relative to rear ends 30B and 31B. A generally horizontal floor/plate 34 is located at upstream end 24 of fixture 22, and is rigidly affixed to, and extends between, front ends 30A and 31A of beams 30 and 31, respectively. Plate 40 extends rearwardly toward downstream end 24 of fixture 22 to an upstanding back wall 35. Back wall 35 is rigidly affixed to, and extends between, beams 30 and 31 at a generally intermediate position between upstream and downstream ends 23 and 24 of fixture 22 corresponding generally to the location of transverse beam 32. Back wall 35 has a lower end 36 rigidly affixed to plate 40, and extends upwardly therefrom to an upper end 37 rigidly affixed to transverse beam 32.

Base 21 has opposed left and right side arms 40 and 41. Arm 40 is elongate and has an inner end 42 rigidly affixed to front end 30A of beam 30 at left side 25 of fixture 22, and extends outwardly therefrom to an outer end 43. Arm 41 is elongate and has an inner end 44 rigidly affixed to front end 31A of beam 31 at right side 26 of fixture 22, and extends outwardly therefrom to an outer end 55. Arms 40 and 41 are generally equal in length.

Figure 2:
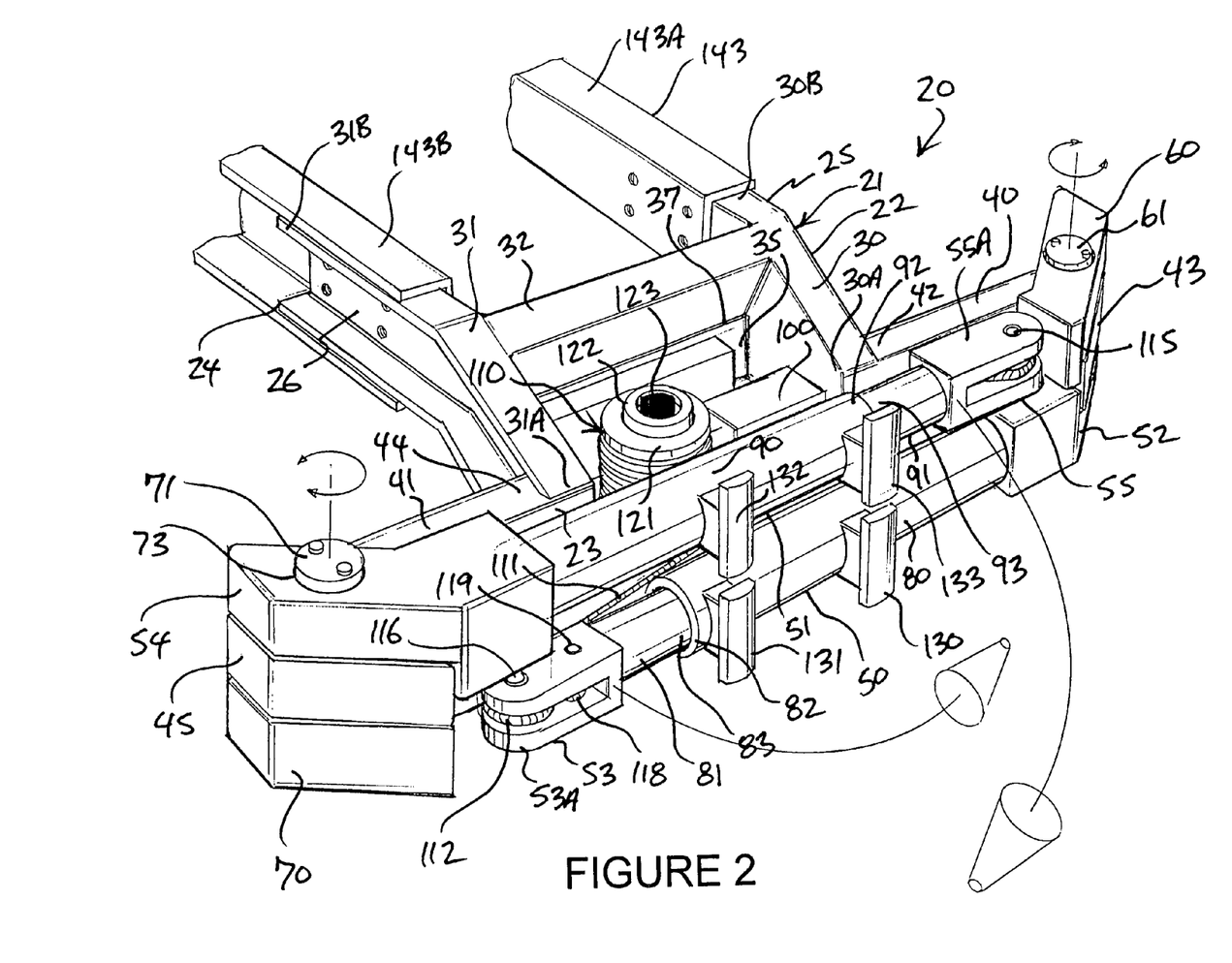
FIG. 2 is a perspective view of the vehicle arresting device of FIG. 1 with the supports shown as they would appear closed.

Supports 50 and 51 are attached to arms 40 and 41, respectively, and are together movable relative to base 31 between an open or deployed position as shown in FIG. 1, and a closed or stored position as shown in FIG. 2. Support 50 is the left side support of vehicle arresting device 20, and support 51 is the right side support of vehicle arresting device 20. Support 50 is elongate and includes opposing inner and outer ends 52 and 53, and support 51 is elongate and includes opposing inner and outer ends 54 and 55. Supports 50 and 51 are fashioned of steel, aluminum, titanium, or other substantially rigid material or combination of materials, and are substantially equal in length.

A motor 60 is rigidly affixed to the topside of arm 40 at outer end 43, such as with nut-and-bolt assemblies, rivets, or other suitable form of mechanical fasteners, and is operatively coupled to a drive shaft 61 which extends into and through an opening (not shown) formed through outer end 43 and into a corresponding socket 62 formed in inner end 52 of support 50, which is located at the underside of arm 40 at outer end 43. Drive shaft 61 is rigidly affixed to socket 62, preferably by a press fit attachment or other suitable form of rigid engagement, such as a keyed engagement, pinning, welding, etc., thereby securing support 50 to outer end 43 of arm 40 and, moreover, to base 21. Motor 60 is operative for driving/rotating drive shaft 61 in clockwise and counterclockwise directions for moving support 50 between its open/deployed position as shown in FIG. 1, and its closed/stored position as shown in FIG. 2. The movement of support 50 between its open and closed positions is indicated generally by the arcuate arrowed line A in FIG. 1. In a preferred embodiment, motor 60 is an electric servomotor. However, other motor forms can be used for imparting movement of support 50 between its stored and deployed positions, include any suitable form of electric motor, a piston assembly, a cylinder assembly, a motorized gear assembly, or other motor form as may be desired.

A motor 70 is rigidly affixed to the underside of arm 41 at outer end 45, such as with nut-and-bolt assemblies, rivets, or other suitable form of mechanical fasteners, and is operatively coupled to a drive shaft 71 which extends into and through an opening 72 formed through outer end 45 and into a corresponding socket 73 formed in inner end 54 of support 51, which is located at the top side of arm 41 at outer end 45. Drive shaft 71 is rigidly affixed to socket 73, preferably by a press fit attachment or other suitable form of rigid engagement, such as a keyed engagement, pinning, welding, etc., thereby securing support 51 to outer end 45 of arm 41 and, moreover, to base 21. Motor 70 is operative for driving drive shaft 71 in clockwise and counterclockwise directions for moving support 51 between its open/deployed position as shown in FIG. 1, and its closed/stored position as shown in FIG. 2. The movement of support 51 between its open and closed positions is indicated generally by the arcuate arrowed line B in FIG. 1. The opening formed through inner end 52 of support 51, while not show, is identical to that of opening 72 formed through inner end 54 of support 51, and the foregoing discussion of opening 72 through inner end 54 of support 51 applies equally to the opening formed through inner end 52 of support 50. In a preferred embodiment, motor 70 is a servomotor. However, other motor forms can be used for imparting movement of support 51 between its stored and deployed positions, include any suitable form of electric motor, a piston assembly, a cylinder assembly, a motorized gear assembly, or other motor form as may be desired.

In their open or deployed positions, supports 50 and 51 extend away from outer ends 43 and 45, respectively, of base 21, and are spaced apart and generally parallel relative to one another, in which outer ends 53 and 55 are disposed in a spaced apart relation relative to on another forwardly of base 21 as seen in FIG. 1. In their closed or stored positions, supports 50 and 51 are folded inwardly relative to base 21 and are together generally parallel relative to arms 40 and 41 as seen in FIG. 2, in which support 51 is positioned atop support 50. The arrangement of support 51 positioned atop support 50 in the closed or stored position of supports 50 and 51 is due primarily to the fact that inner end 54 of support 51 is mounted to the top side of arm 41, and that inner end 52 of support 50 is mounted to the underside of arm 40. It is to be understood that this arrangement of supports 50 and 51, and, thus, the arrangement of motors 60 and 70 relative to inner ends 54 and 52, respectively, can be reversed, if desired, such that when in their closed positions support 50 lies atop support 51. In their closed positions, supports 50 and 51 are parallel relative to one another and reside in a substantially common vertical plane.

Figure 3:
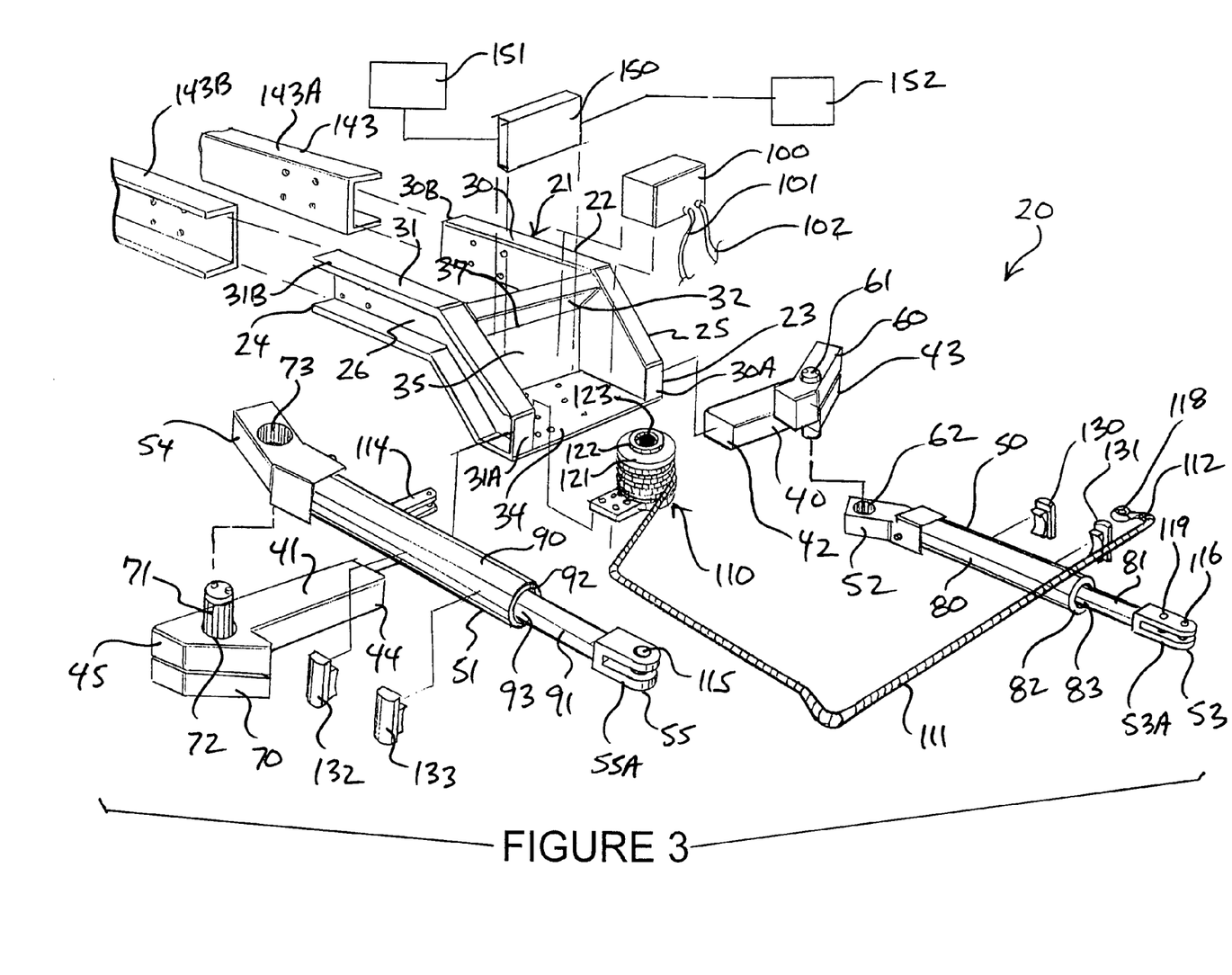
FIG. 3 is an exploded perspective view of the vehicle arresting device of FIG. 1.

Supports 50 and 51 are each adjustable between retracted/shortened positions, and extended/lengthened positions. Referring to FIGS. 1-3, support 50, in this preferred embodiment, is a hydraulic cylinder assembly, which includes a hydraulic cylinder 80, and a rod 81. Cylinder 80 forms inner end 52, and has an opposing outer 82. Rod 81 forms outer end 53, and has an inner end 83 partially received into outer end 82 of cylinder 80. Rod 81 is movable by cylinder 80 in reciprocal directions between retracted and extended position relative to cylinder 80 as generally indicated by the double arrowed line C in FIG. 1, thereby enabling the adjustment of support 50 between shortened/retracted and lengthened/extended positions, according to the principle of the invention. Like support 50, support 51, in this preferred embodiment, is also a hydraulic cylinder assembly, which includes a hydraulic cylinder 90, and a rod 91. Cylinder 90 forms inner end 54 of support 51, and has an opposing outer 92. Rod 91 forms outer end 55, and has an inner end 93 partially received into outer end 92 of cylinder 90. Rod 92 is movable by cylinder 90 in reciprocal directions between retracted and extended position relative to cylinder 90 in the direction generally indicated by the double arrowed line D in FIG. 1, thereby enabling the adjustment of support 51 between shortened/retracted and lengthened/extended positions, according to the principle of the invention.

A hydraulic fluid pump 100 is mounted to plate 40 between inner ends 30A and 31A of beams 30 and 31, and is operative for activating cylinders 80 and 90. Pump 100 is operatively coupled to cylinders 80 and 90 via hydraulic fluid lines 101 and 102, respectively. Pump 100 contains hydraulic fluid, and is operative for pumping hydraulic fluid to and from cylinders 80 and 90 via lines 101 and 102, respectively. Pump 100 pumps hydraulic fluid to cylinders 80 and 90 to extend rods 81 and 91, respectively, and pumps hydraulic fluid from cylinders 80 and 90 to retract rods 81 and 91, respectively.

Referring to FIGS. 1 and 3, outer ends 53 and 55 of supports 50 and 51 are bifurcated mounts 53A and 55A, respectively, which support idlers 115 and 116, respectively. A spool 110 is mounted to plate 40 between inner ends 30A and 31A of beams 30 and 31 adjacent to pump 100, and on this spool 110 is wound a cable 111. Cable 111 is an elongate flexible member which is strong, resilient, and fashioned of numerous strands of steel, fiber, wire, or the like, which are wound, twisted or braided together. A portion of cable 111 is unwound relative to spool 110, and shown, and is wielded by supports 50 and 51. In particular, the unwound portion of cable 111 wielded by supports 50 and 51 is carried first around a catch 114 mounted to cylinder 90, then around idler 115 formed at outer end 55 of support 51, and then around idler 116 formed at outer end 53 of support 50, which then terminates with a free end 112 attached to outer end 53 of support 50, according to the principle of the invention.

Figures 7, 8, 9:
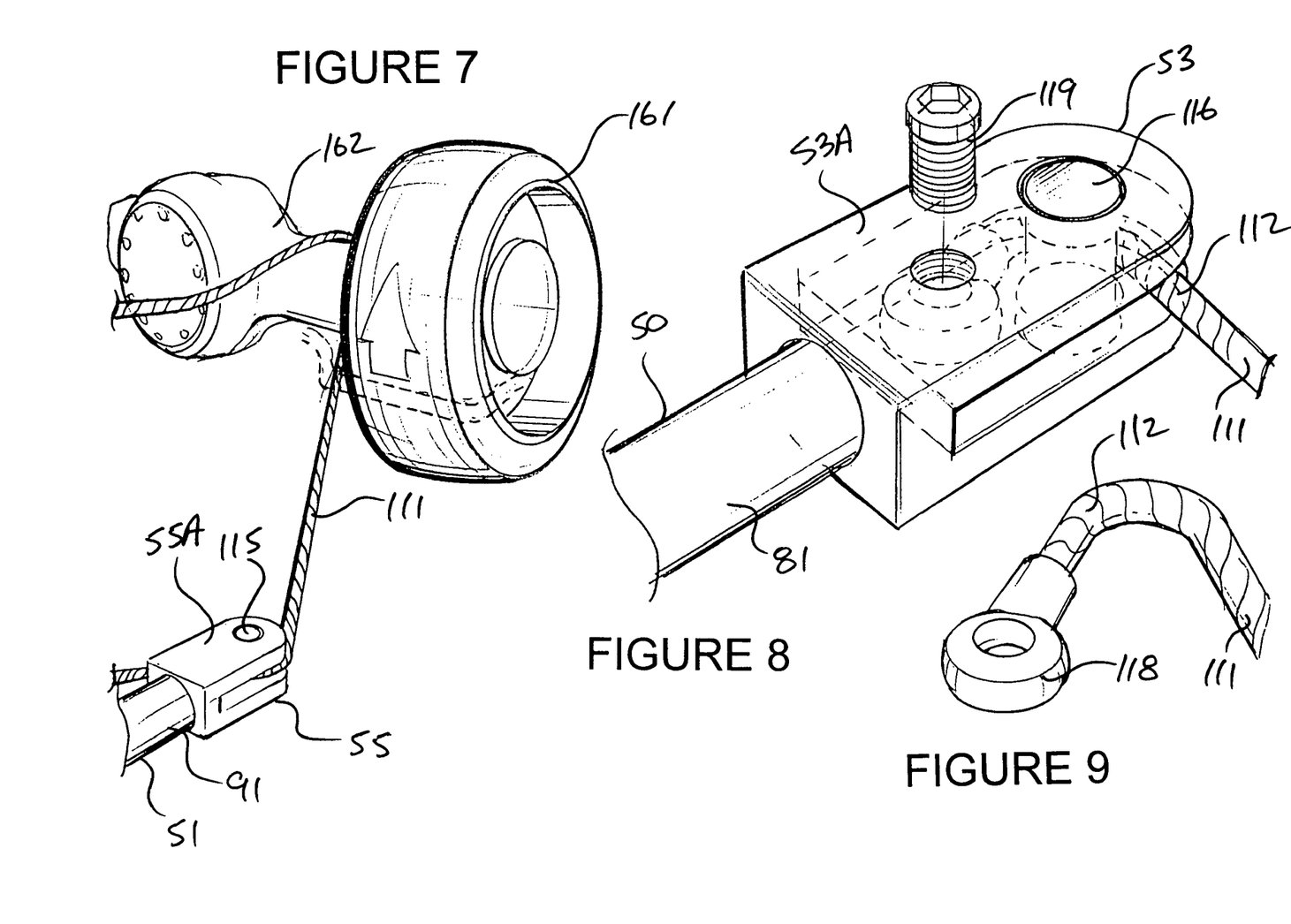
FIG. 7 is a fragmented perspective view of a rear axle of a vehicle shown as it would appear captured by the cable of the vehicle arresting device of FIG. 1.
FIG. 8 is a partially schematic, partially exploded fragmented perspective view of an end of the left side support of the vehicle arresting device of FIG. 1 shown associated with an end of the cable, in which the end of the cable is depicted in phantom outline for illustrative purposes.
FIG. 9 is a fragmented perspective view of the cable illustrating the end thereof shown in phantom outline in FIG. 8.

As seen in FIGS. 3 and 9, free end 112 of cable 111 is formed with an eye 118. Referring to FIG. 1, eye 118 is positioned in mount 53A and is secured to mount 53A with a pin 119, which is affixed to mount 53A and extends through eye 118 securing free end 112 of cable 111 to outer end 53 of support 50. FIG. 9 is an enlarged perspective view of outer end 53 of support 50, illustrating free end 112 of cable 111 carried around idler 116 attached to mount 53A, and pin 119. In this embodiment, pin 119 is a threaded bolt, which extends through eye 118 and is threadably secured to mount 53A allowing it to be removed for releasing eye 118 thereby detaching free end 112 of cable 111 from outer end 53 of support 50. Those having ordinary skill will readily appreciate that free end 112 of cable 111 can be secured to outer end 53 of support in other ways.

Spool 110 is conventional, and is provided with a drum having a conventional electronic brake 121 and within which is housed a coil spring 122 with one end secured to the axle 123 of the spool and the other end to the drum, whereby spool 110 is tensioned as cable 111 is unwound. The strength of spring 122 is sufficient to take care of any slack in cable 11 when the same is extended, rewinding spool 110 to take up the slack. Cable 111 winds and unwinds relative to spool 110 in response to movement of supports 50 and 51 between their open/deployed and closed/stored positions, and in response to movement of supports 50 and 51 between their shortened and lengthened positions when in their deployed or open positions.

Catch 114, idlers 115 and 116, and the attachment of free end 112 of cable 111 to outer end 53 of support 50 maintain cable 111 relative to supports 50 and 51, and allow supports 50 and 51 to wield cable 111, according to the principle of the invention. In the closed or stored positions of supports 50 and 51 as shown in FIG. 2, cable 111 winds relative to spool 110 taking up any slack in cable 111. As supports 50 and 51 are moved into their open positions, cable 111 unwinds relative to spool 110, a length of which is suspended by and between outer ends 53 and 55 of supports 50 and 51, respectively, in accordance with the principle of the invention.

As seen in FIG. 1, bumper elements 130 and 131 are rigidly mounted to the outer side of cylinder 80, and bumper elements 132 and 133 are mounted to the outer side of cylinder 90. In the closed or stored position of supports 50 and 51 as seen in FIG. 2, bumper element 130 carried by cylinder 80 registers with bumper element 133 carried by cylinder 90 thereby together cooperating to form a bumper, and bumper element 131 carried cylinder 90 registers with bumper element 132 carried by cylinder 90 thereby together cooperating to form another bumper. The bumper formed by the cooperation of bumper elements 130 and 133 and the opposed bumper formed by the cooperation of bumper elements 131 and 132 in the closed positions of supports 50 and 51 projecting forwardly, are substantially parallel relative to one another, and are used to bump pursued vehicles, when needed.

Figure 4:
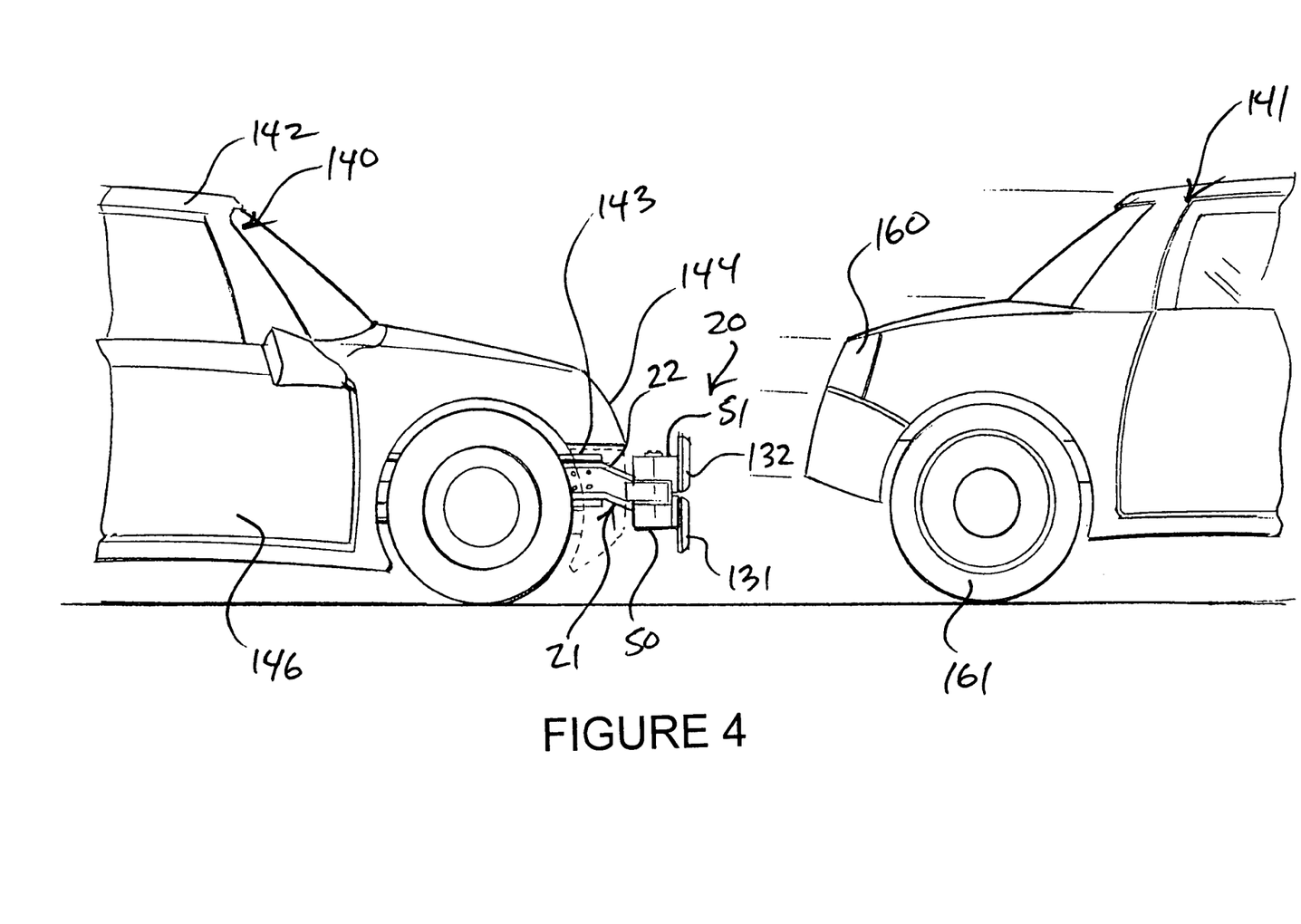
FIG. 4 is a fragmented side elevational view of a pursuit vehicle, incorporating the vehicle arresting device of FIG. 1, shown as it would appear pursuing a pursued vehicle with the supports shown closed or stored.

Vehicle arresting device 20 is mounted to a pursuit vehicle, such as a police car/cruiser, and is used to arrest a pursued vehicle, in accordance with the principle of the invention. Vehicle arresting device 20 is typically mounted to the front end of a pursuit vehicle, and may be mounted to the existing front bumper, or to the existing push bars commonly found in conjunction with conventional police cars. In accordance with a preferred embodiment, in FIG. 4 there is seen a pursuit vehicle 140 incorporating vehicle arresting device 20 and shown as it would appear pursuing a pursued vehicle 141 to be arrested, i.e., brought to a controlled stop. As seen in FIG. 4, pursuit vehicle 140 includes a body 142 supported conventionally by a frame or chassis 143. Pursuit vehicle 140, which is exemplary of a police car or police cruiser, has a front or forward end 144 and, as referenced in FIG. 6, a left side 145 and an opposing right side 146. Downstream end 24 of fixture 22 of base 21 is affixed to chassis 143 at front end 144 of pursuit vehicle 140 securing base 21 to front end 114 of pursuit vehicle 140 and supporting vehicle arresting device 20 at front end 144 of pursuit vehicle 140, in accordance with the invention.

Turning to FIG. 1, a portion of chassis 143 is shown consisting of opposed chassis beams 143A and 143B, which are rigidly affixed to rear ends 30B and 31B of beams 30 and 31, respectively. Rear ends 30B and 31B somewhat overlap chassis beams 143A and 143B, respectively, and are rigidly affixed together with nut-and-bolt assemblies, rivets, welding, or the like, thereby producing the attachment of fixture 22 of base 21 to chassis 143, and, thus, vehicle arresting device 20 to pursuit vehicle 140 as shown in FIG. 4. When base 21 is coupled to pursuit vehicle 140 as herein described, supports 50 and 51 are considered mounted to pursuit vehicle 140. Properly installed as herein described, and with reference to FIG. 6, vehicle arresting device 20 projects forwardly of front end 144 of pursuit vehicle 20, arms 40 and 41 are substantially parallel relative to front end 144 of pursuit vehicle 140, outer end 43 of arm 40 is disposed adjacent to left side 145 of pursuit vehicle 140 at front end 144, and outer end 45 of arm 41 is disposed adjacent to right side 146 of pursuit vehicle 140.

Figure 10:
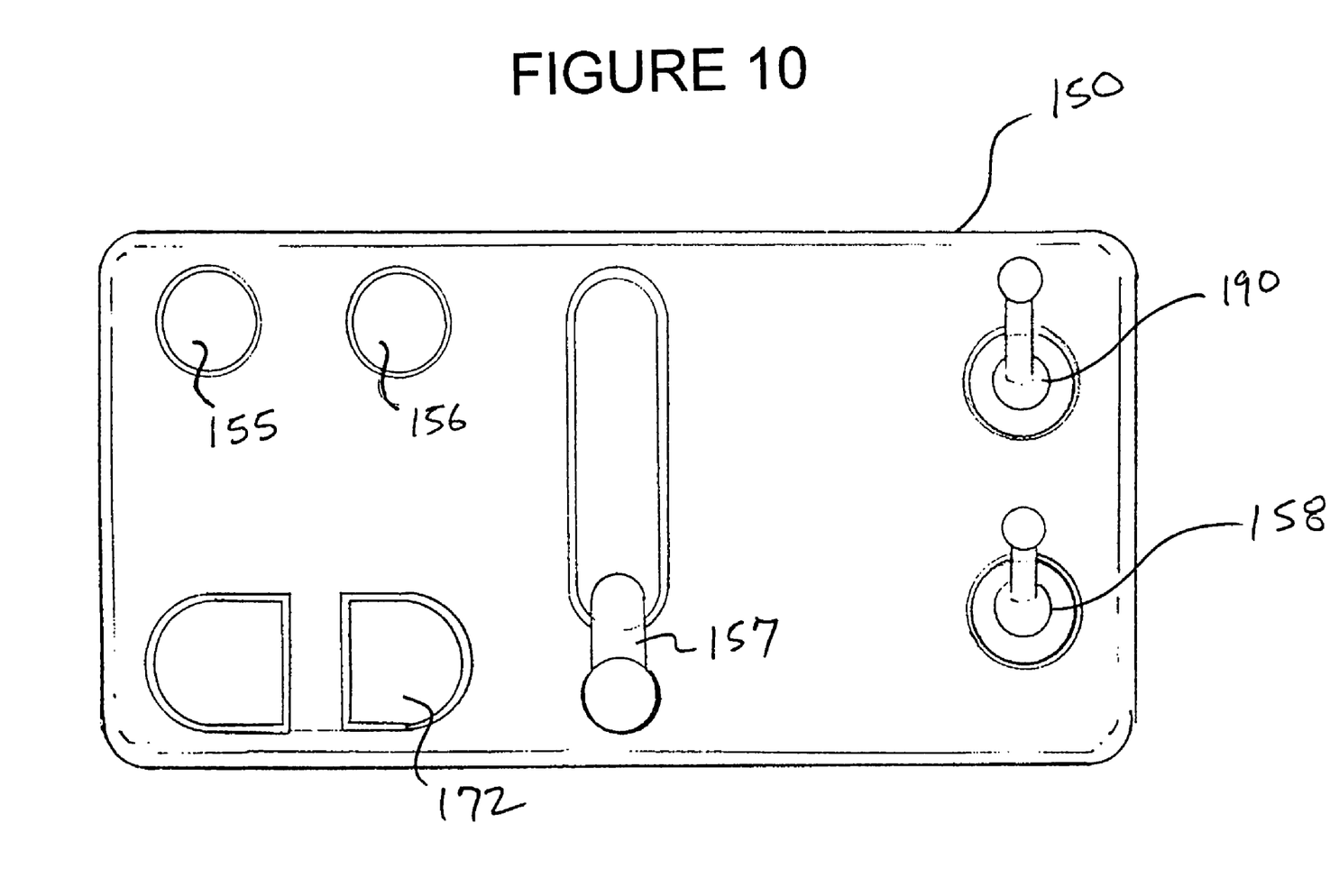
FIG. 10 is a schematic view of a control panel for operating the vehicle arresting device of FIG. 1.

Referring back to FIGS. 1-3, hydraulic pump 100, motors 60 and 70, and brake 121 are coupled in electrical and signal communication to a controller 150 via conventional electrical wiring (not shown), which is in turn coupled in electrical and signal communication to a control panel 151 shown in FIG. 10 also with conventional electrical wiring (not shown). Control panel 151 is configured to accept inputs from inside pursuit vehicle 140 used to control the operation of motors 60 and 70 for moving supports 50 and 51 between their open and closed positions, to control the operation of pump 100 for moving supports 50 and 51 between their shortened and extended positions, and to control the operation of brake 121 for stopping spool 110 from rotating. Inputs from control panel 151 are relayed to motors 60 and 70, pump 100, and brake 121 through controller 150. Controller 150, which is a conventional controller, is coupled to a power source 152 (FIG. 3), which provides power to controller 150, and which relays power provided by power source 152 via the electrical wiring therebetween to motors 60 and 70, pump 100, brake 121, and control panel 151. Power source 152 is a vehicle battery, which is preferably the pursuit vehicle battery as a matter of convenience, although it may be a different battery. After installing vehicle arresting device 20 to pursuit vehicle 140 in a preferred embodiment, controller 150 is coupled to receive power from the pursuit vehicle battery with conventional electrical wiring, and control panel 151, which is coupled in electrical and signal communication to controller 150, is mounted inside the cab or passenger compartment of pursuit vehicle 140 making it easily accessible by the driver of pursuit vehicle 140.

After mounting vehicle arresting device 20 to pursuit vehicle 140, coupling controller 150 to power source 152 and mounting control panel 151 inside the cab or passenger compartment of pursuit vehicle 140, all is in order to use vehicle arresting device 20 to arrest a pursued vehicle, in accordance with the invention. Looking to FIG. 10, control panel 151 has an ON/OFF switch 155 for turning controller 150 ON and OFF, a motor switch 156 for activating motors 60 and 70 to move supports 50 and 51 between their closed and open positions, a pump switch 157 for activating pump 100 for activating cylinders 80 and 90 extending and retracting rods 81 and 91, and a brake switch 158 for activating brake 121. Switches 155-158 are conventional electrical toggle switches, although any suitable form of electronic switches can be used for operating their corresponding devices.

After turning controller 150 ON with ON/OFF switch 155, vehicle arresting device 20 charged and ready for use. In the closed or stored position of supports 50 and 51, the bumpers formed by bumper elements 130-133 project forwardly of front end 144 of pursuit vehicle 140, and are used to bump a pursued vehicle as may be required in order to bring the pursued vehicle to a controlled stop. Because fixture 22 is secured to chassis 143 of pursuit vehicle 140, chassis 143 absorbs the brunt of the force applied to the bumpers formed by bumper elements 130-133 in the closed positions of supports 50 and 51.

Figure 5:
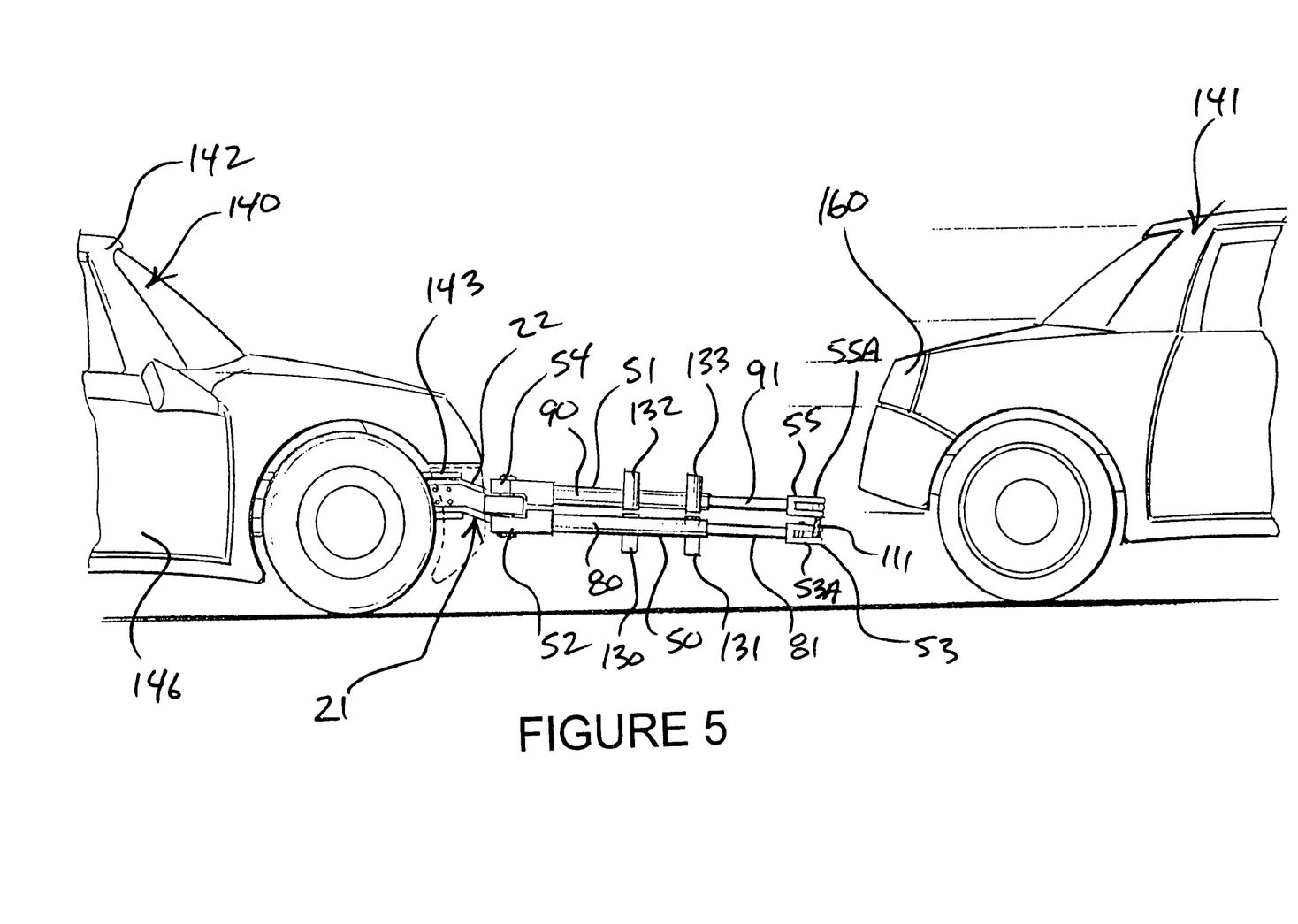
FIG. 5 is a view very similar to the view of FIG. 1 illustrating the supports of the vehicle arresting device shown as they would appear open or deployed.

To engage vehicle apparatus 20 in arresting a pursued vehicle, motors 60 and 70 are actuated with motor switch 156 moving supports 50 and 51 from their closed or stored positions as shown in FIG. 4 to their open positions as shown in FIG. 5 suspending a length of cable 111 between outer ends 53 and 55. Supports 50 and 51 extend somewhat downwardly in their open positions as shown in FIG. 5. With the length of cable 111 suspended between outer ends 53 and 55, the driver of pursuit vehicle 140 accelerates to advance toward rear end 160 of pursued vehicle 141 bringing the length of cable 111 suspended between outer ends 53 and 55 underneath rear end 160 of pursued vehicle 141 and outer ends 53 and 55 of supports 50 and 51 along either side of or a rotating rear wheel 161 of pursued vehicle 140 thereby bringing the length of cable 111 suspended between outer ends 53 and 55 into engagement with rear wheel 161 of pursued vehicle 142. The downward angle of supports 50 and 51 in their open positions allow them to present outer ends 53 and 55 and the length of cable 111 suspended therebetween beneath the rear end of a pursued vehicle.

In this example, rear wheel 161 is the right side rear wheel 161 of pursued vehicle 142, but it is to be understood that the use of vehicle arresting device 20 may also be used in conjunction with the left side rear wheel (not shown) of pursued vehicle 141. When the length of cable 111 suspended between outer ends 53 and 54 of supports 50 and 51 engages rear wheel 161, the rotation of rear wheel frictionally acts against cable 111 pulling it and drawing it upwardly and around rear wheel 161. As the pursued vehicle 142 continues forward, cable 111 is drawn by rear wheel 161 forwardly and completely around rear wheel 161 until it is run over by rear wheel 161 thereby looping the length of cable 111 suspended between outer ends 53 and 54 of supports 50 and 51 around the axle 162 to which rear wheel 161 is attached as shown in FIG. 7, according to the principle of the invention. At this point, pursued vehicle 142 is captured by pursuit vehicle 140. When the length of cable 111 suspended between outer ends 53 and 54 of supports 50 and 51 engages rear wheel 161 and the rotation of rear wheel 161 pulls against cable 111 drawing it around rear wheel 161, the pulling force applied to cable 111 suspended between outer ends 53 and 55 of supports 50 and 51 may cause cable 111 to unwind relative to spool 110 overcoming the bias applied by spring 122 of spool 110 in order to supply any needed slack to cable 111.

After capturing pursued vehicle 142 as herein described, brake switch 158 may be actuated to lock spool 110 and prevent it from rotating and thereby forming a fixed length of cable 111 between spool 110 and outer end 53 of support 50. At this point, the driver of pursuit vehicle 140 may apply the brakes of pursuit vehicle 140 to bring it, and pursued vehicle 142, to a forcible stop thereby resulting in the arrest of pursued vehicle 142. As the brakes are applied to pursuit vehicle 140 to forcibly bring pursued vehicle 142 to a stop, a considerable amount of force may be applied to cable 111 which may draw outer ends 53 and 55 of supports 50 and 51 toward one another, which is acceptable and expected.

After completion of the arrest of pursued vehicle 142, the length of cable 111 between outer ends 53 and 55 of supports 50 and 51 may be unwrapped/unlooped relative to axle 162 and rear wheel 161. Brake switch 158 is again actuated releasing brake 121, wherein the tension or bias applied to spool 110 with spring 122 rotates spool 110 taking up any slack in cable 111. To place supports 50 and 51 back into their stored positions, motors 60 and 70 are actuated again with motor switch 156 moving supports 50 and 51 from their open positions to their closed positions in preparation for reuse.

Figure 6:
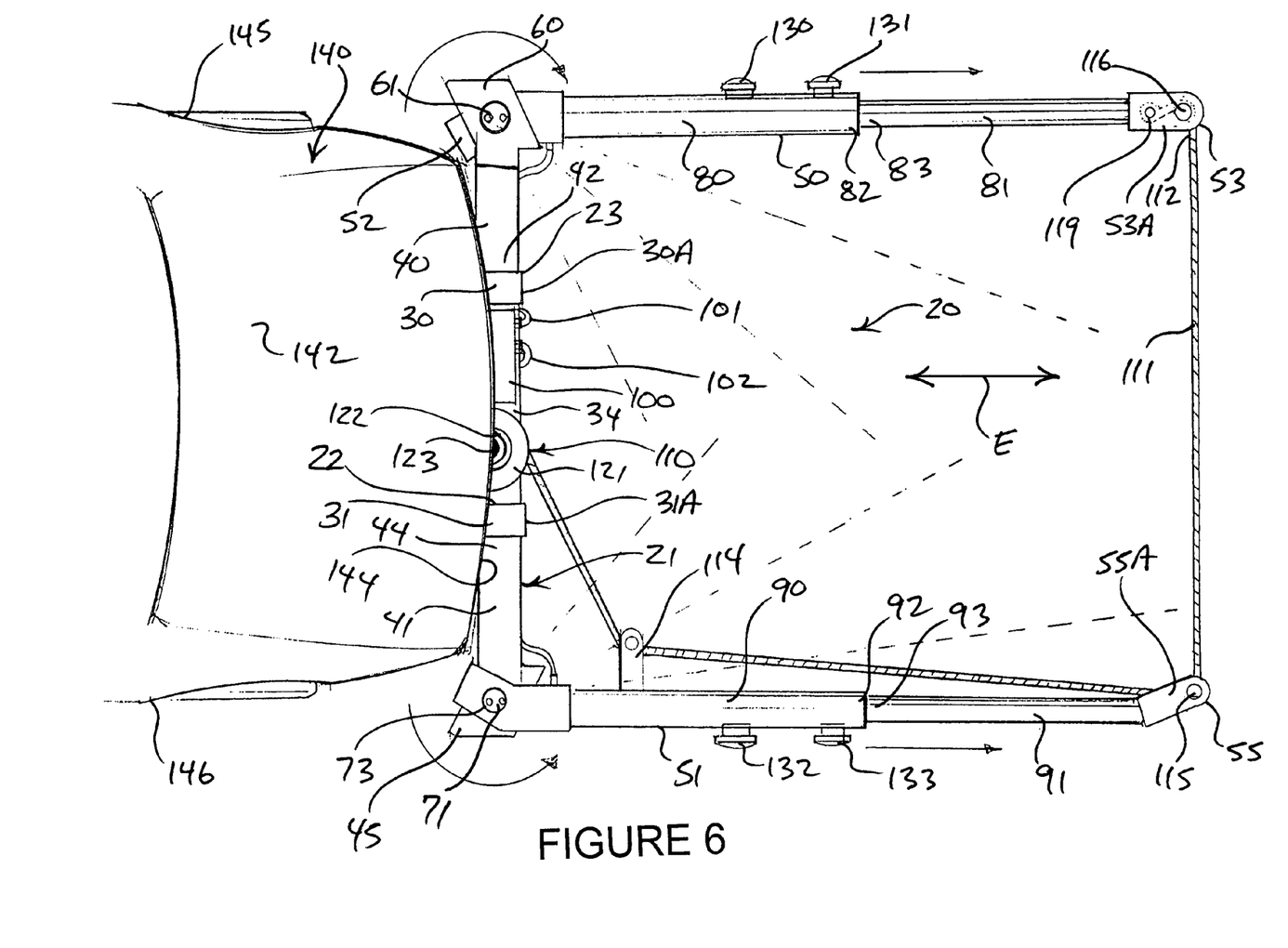
FIG. 6 is a fragmented top plan view of the pursuit vehicle of FIG. 5 showing the supports of the vehicle arresting device as they would appear open.

When supports 50 and 51 are in their open position suspending a length of cable 111 between outer ends 53 and 55 thereof, respectively, in preparation to arrest a pursued vehicle and forming an exemplary embodiment of the invention, supports 50 and 51 may be moved between their shortened and lengthened positions for moving cable 111 suspended between outer ends 53 and 55 of supports 50 and 51 in reciprocal directions relative to base 21 and, moreover, relative to front end 144 of pursuit vehicle 140 as indicated by the double arrowed line E in FIG. 6. From their shortened positions, supports 50 and 51 are extended, if desired, in order to help reach the pursued vehicle. To extend supports 50 and 51, pump 100 is activated with pump switch 157, which pumps hydraulic fluid to cylinders 80 and 90 extending rods 81 and 91 as shown in FIG. 6 thereby extending the length of cable 111 suspended between outer ends 53 and 55 of supports 50 and 51 relative to base 21 and, moreover, relative to front end 144 of vehicle 140 and toward a pursued vehicle. To move supports 50 and 51 back into their shortened positions, pump 100 is again activated with pump switch 157, which pumps hydraulic fluid from cylinders 80 and 90 retracting rods 81 and 91 relative to cylinders 80 and 90, respectively.

Figures 11, 12:
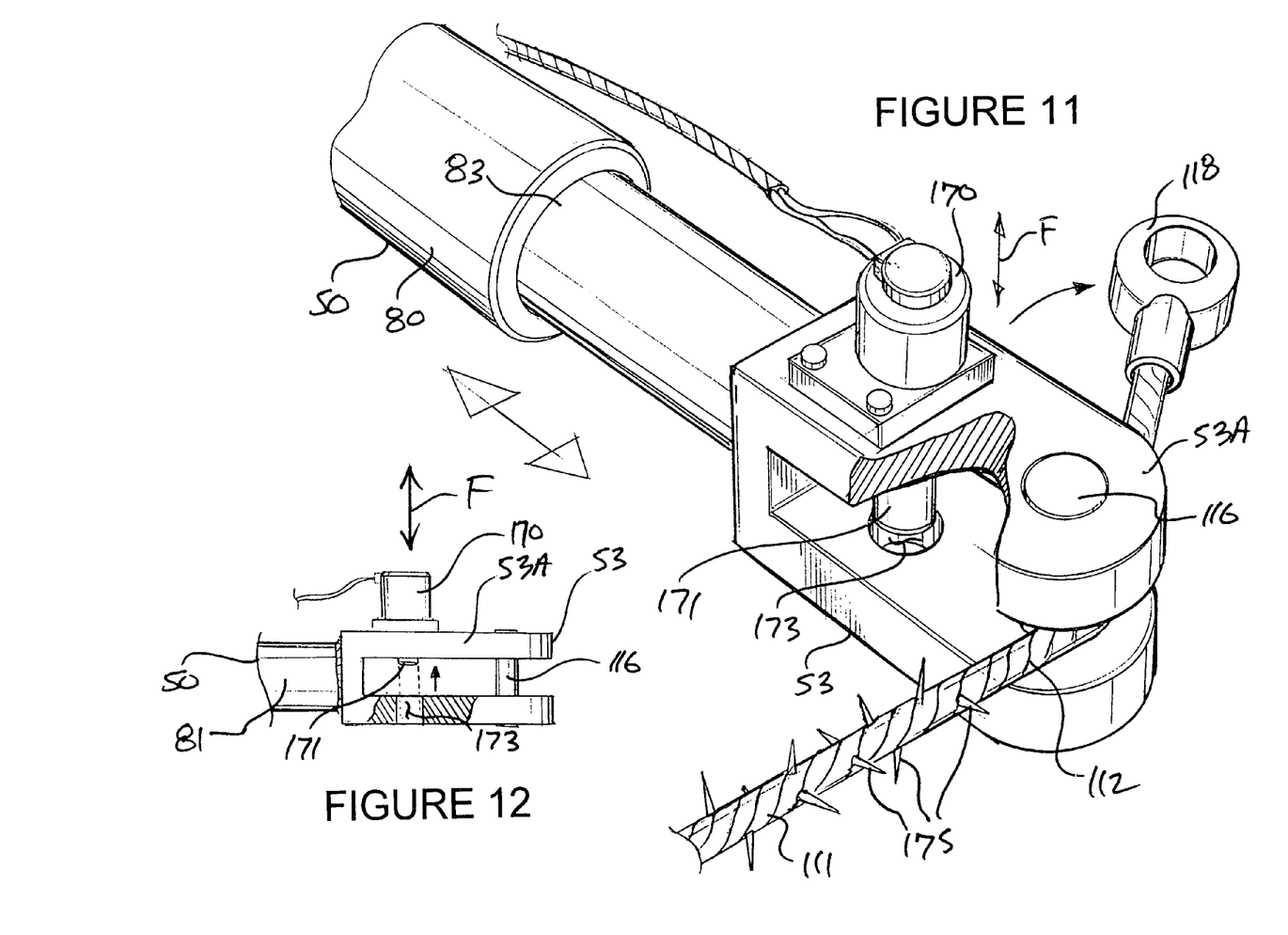
FIG. 11 is a fragmented perspective view of an alternate embodiment of the end of the left side support of FIG. 9.
FIG. 12 is a side elevational view of the alternate embodiment of the end of the left side support of FIG. 11, with portions thereof broken away for illustrative purposes.

In some instances it may be desirable to release a pursued vehicle after it is captured by vehicle arresting device 20, particularly if arresting the pursued vehicle to a controlled stop proves especially difficult or especially dangerous. To accomplish this, FIGS. 11 and 12 illustrate an alternate embodiment of outer end 53 of support 50. In this embodiment, pin 119 previously discussed is replaced by a solenoid 170 attached to one side of mount 53A, which is operatively coupled to a detachment pin 171. In this embodiment, solenoid 170 is operatively coupled to controller 150 (not shown in FIGS. 11 and 12) via conventional electrical wiring, which is in turn operatively coupled to, as seen in FIG. 10, a pin release switch 172 of control panel 150 via conventional electrical wiring. Solenoid 170 is operative for moving pin 171 between withdrawn and extended positions as generally indicated by the double arrowed line F in FIGS. 11 and 12. Pin release switch 172 is a conventional toggle switch. To secure free end 112 of cable 111 to outer end 53 of support 50 as seen in FIG. 11, eyelet 118 is positioned in mount 53A and is registered with pin 171, and solenoid 170 is activated with switch 171, which forcibly extends pin 171 into and through eye 118 and into a corresponding opening 173 formed in the opposing side of mount 53A. To detach free end 112 from outer end 53 of support 50, solenoid 170 is again activated with switch 171 causing it to withdraw from eye 118 thereby detaching eye 118 and releasing free end 112 of cable 111. After free end 112 of cable 111 is released from outer end 53 of support 50, cable is free to unloop relative to, and thereby release, a captured pursued vehicle, according to the principle of the invention.

FIG. 11 is further instructive as it shows cable 111 configured with tire piercing elements or spikes 175, which are operative for puncturing and flattening a tire of a pursued vehicle. According to the invention, when cable 111 is drawn around a rear tire while using vehicle arresting device 20 to arrest a pursued vehicle and the rear tire runs over cable 111, tire piercing elements or spikes 175 will puncture the tire and flatten it, which will, of course aid in the arrest of the pursued vehicle. Furthermore, after the tire of a pursued vehicle is flattened as a result of running over cable 111 as cable 111 is drawn around the tire during the capture of the pursued vehicle, the provision of solenoid 170, pin 171, and switch 172 provides the driver of the pursuit vehicle with the option of releasing free end 112 of cable 111 from outer end 53 of support 50 for allowing cable 111 to unloop relative to, and thereby release, the captured pursued vehicle.

The arrangement set forth in FIGS. 11 and 12 of releasably securing free end 112 of cable 111 to outer end 53 of support 50 which allows the driver of a pursuit vehicle to release free end 112 of cable 111 from outer end 53 of support 50 from within pursuit vehicle 140 is exemplary and increases the usefulness of vehicle arresting device. If desired, reel 110 can be omitted entirely, and outer end 55 of support 51 together with cable 111 configured exactly like that of outer end 53 set forth in FIGS. 11 and 12 and the attachment of free end 112 of cable disclosed therein for providing a releasable attachment of cable 111 to outer ends 53 and 55 of supports 50 and 51. In this embodiment, it is to be understood that the arrangement of outer end 53 of support 50 in FIGS. 11 and 12, including the provision of switch 172 activated solenoid 170 and pin 171 and opening 173 and the attachment of the corresponding free end of cable 111 applies in every respect to outer end 55 of support 51, and is, therefore, not depicted by way of a separate drawing figure. In the embodiment where outer end 55 of support 51 is configured like that of outer end 53 of support 50 set forth in FIGS. 11 and 12, cable 111 is considerably shorter in length as compared to the embodiment designated 20 incorporating spool 110, and actually need only be long enough to span the distance between outer ends 53 and 55 of supports 50 and 51 in the deployed or open position of supports 50 and 51. And so in the embodiment of outer end 55 configured like that of outer end 53 in FIGS. 11 and 12, cable 111 may be completely released from outer ends 53 and 55 of supports 50 and 51 through the activation of switches from within the pursuit vehicle. Again, the complete release of cable 111 from vehicle arresting device 20 may be desired in the event the driver of the pursued vehicle wishes to abort the capture and arrest of a pursued vehicle, or after the tire of a pursued vehicle is flattened by tire piercing elements or spikes 175 of cable 111 shown in FIG. 11.

Figure 13:
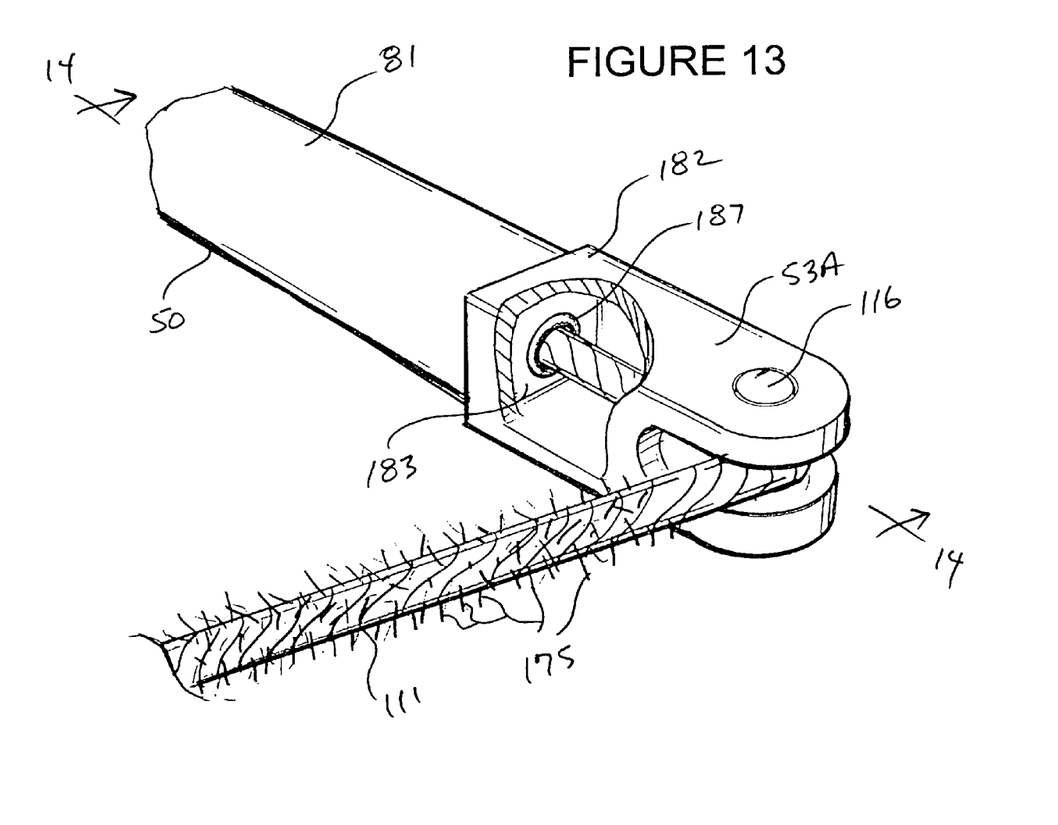
FIG. 13 is a perspective view of yet another embodiment of the end of the left side support of FIG. 9.
Figure 14:
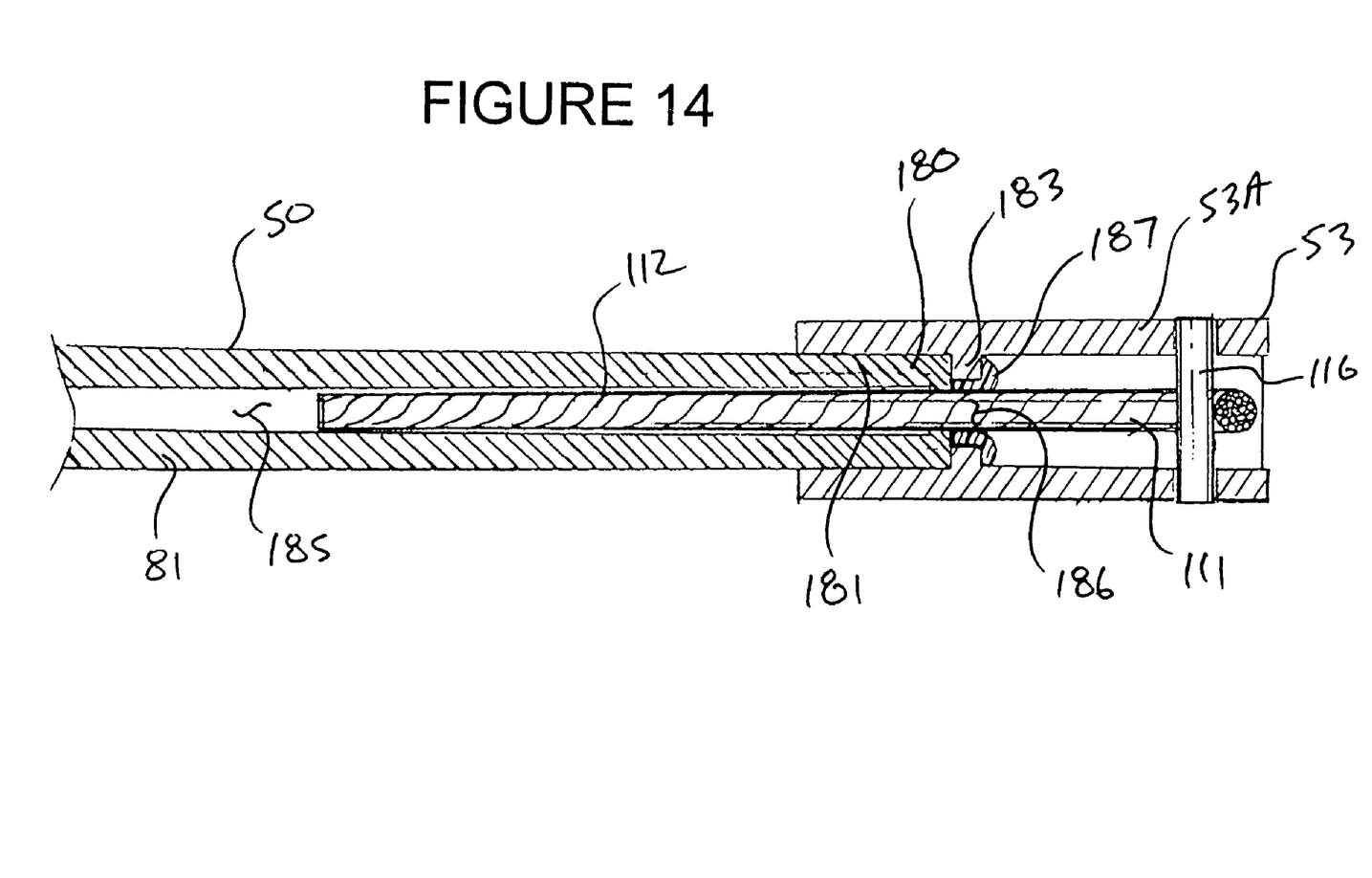
FIG. 14 is a sectional view taken along line 14-14 of FIG. 13.

Free end 112 of cable 111 may be releasably attached to outer end 53 of support 50 in other ways. As a matter of example, FIGS. 13 and 14 illustrate yet another alternate embodiment of outer end 53 of support 50, and a releasable attachment of outer end 53 of support 50 to free end 112 of cable 111. In this embodiment as seen best in FIG. 14, the outer end 180 of rod 81 extends into and rigidly secures a socket 181 formed in inner end 182 of mount 53A, and abuts against an intermediate interior endwall 183 of mount 23A. Free end 112 of cable 111 is carried around idler 116 supported by mount 53A and extends rearwardly from idler 116 into a bore 185 formed in rod 81 through an opening 186 formed in endwall 183. A rubber grommet 187 encircles cable 111 at opening 186 formed in endwall 183, and is affixed, such as with adhesive, to the annular rim of endwall 183 defines opening 186 therethrough. Free end 112 is simply fitted into bore 185 through opening 186, and may be easily pulled outwardly therefrom releasing it from outer end 53 of support 50. Rubber grommet 187 encircling cable 111 at opening 186 interacts with cable 111 applying a compressive force against cable 112 thereby providing a modest retention against cable 112 preventing it from inadvertently falling away. This described releasable attachment of free end 112 of cable 111 to outer end 53 of support allows free end 112 to release from outer end 53 in response to a pulling force applied to cable 111. And so when cable 111 is pulled around the tire of a pursued vehicle, the pulling action applied to cable 111 may pull outer end 112 of cable 111 outwardly from bore 185 through opening 186 thereby releasing cable 111 from outer end 53 of support 50 and allowing cable 111 to release from the axle of a pursued vehicle.

FIG. 13 is further instructive as it shows cable 111 configured with tire piercing elements or spikes 175, which, as previously described, are operative for puncturing and flattening a tire of a pursued vehicle. The shape of spikes 175 associated with cable 111 in FIG. 13 are somewhat different in shape from the shape of spikes 175 associated with cable 111 in FIG. 11, and this is illustrated only as a matter of showing examples of different shapes for spikes 175. According to the invention, when cable 111 is drawn around a rear tire while using vehicle arresting device 20 to arrest a pursued vehicle and the rear tire runs over cable 111, tire piercing elements or spikes 175 will puncture the tire and eventually flatten it, which will, of course aid in the arrest of the pursued vehicle. Furthermore, after the tire of a pursued vehicle is flattened as a result of running over cable 111 as it is drawn around the tire during the capture of the pursued vehicle, the provision of the releasable engagement of free end 112 of cable 111 to outer end 53 of support 50 allows the driver of the pursuit vehicle incorporating vehicle arresting device 20 to slow down relative to the pursued vehicle thereby exerting a pulling force against cable 111 sufficient to pull free end 112 of cable 111 free of bore 185 through opening 186. Having punctured the tire, the release of free end 112 of cable 111 from outer end 53 of support 50 allows cable 111 to release the pursued vehicle.

The arrangement set forth in FIGS. 13 and 14 of releasably securing free end 112 of cable 111 to outer end 53 of support 50 which allows the driver of a pursuit vehicle to release free end 112 of cable 111 from outer end 53 of support 50 is exemplary and increases the usefulness of a vehicle arresting device constructed and arranged in accordance with the principle of the invention. If desired, reel 110 can be omitted entirely, and outer end 55 of support 51 together with cable 111 configured exactly like that of outer end 53 set forth in FIGS. 13 and 14 for providing a releasable attachment of cable 111 to outer ends 53 and 55 of supports 50 and 51. In this embodiment, it is to be understood that the arrangement of outer end 53 of support 50 in FIGS. 13 and 14, including all the provisions thereof, applies in every respect to outer end 55 of support 51, and is, therefore, not depicted by way of a separate drawing figure. In this embodiment where outer end 55 of support 51 is configured like that of outer end 53 of support 50 set forth in FIGS. 13 and 14, cable 111 is considerably shorter in length as compared to the embodiment designated 20 incorporating spool 110, and actually need only be long enough to span the distance between outer ends 53 and 55 of supports 50 and 51 in the deployed or open position of supports 50 and 51. And so in the embodiment of outer end 55 configured like that of outer end 53 as set forth in FIGS. 13 and 14, cable 111 may be completely released from outer ends 53 and 55 of supports 50 and 51 through a pulling force applied to cable 111. Again, the complete release of cable 111 from vehicle arresting device 20 may be desired after the tire of a pursued vehicle is flattened by tire piercing elements or spikes 175 of cable 111 as shown in FIG. 13.

The adjustability of supports 50 and 51 between shortened and lengthened positions as herein described is accomplished by providing each of supports 50 and 51 as a hydraulic cylinder assembly consisting of a rod that is movable by a cylinder in reciprocal directions relative to the cylinder. This arrangement of supports 50 and 51 is simple, and efficient. The hydraulic cylinder assemblies constituting supports 50 and 51 each represents a pair of reciprocally adjustable members, in which the cylinder is one of the members and the corresponding rod is reciprocating member. Consistent with this general teaching, it is to be understood other forms of reciprocally adjustable supports can be used for supports 50 and 51 without departing from the invention. Also, the action of hydraulic fluid is the mechanism used in the preferred embodiment to facilitate the reciprocal adjustment of the corresponding rod. A support consisting of one member that reciprocates relative to another member for enabling the adjustment of the support between shortened and lengthened positions may incorporate other mechanisms for enabling this reciprocal adjustment, such as motorized rack-and-pinion assemblies, motorized gear assemblies, etc. Pneumatic cylinder assemblies may also be used for supports 50 and 51, if desired. According to the principle of the invention, any elongate support consisting of corresponding reciprocating members movable operative for adjusting the support between shortened and lengthened positions may be used for supports 50 and 51 without departing from the invention.

Spool 110 is not a motorized spool in the preferred embodiment. However, spool 110 may be configured with a conventional motor to thereby provide spool as a conventional motorized winch. In this embodiment, the winch may be activated by a winch switch 190 (FIG. 10) on control panel 150 for imparting rotation to spool 110 as need or required for unwinding and winding cable 111 relative to spool 110.

The invention has been described above with reference to preferred embodiments. However, those skilled in the art will recognize that changes and modifications may be made to the embodiments without departing from the nature and scope of the invention. For instance, in the preferred embodiment base 21 is secured to pursuit vehicle 140, and supports 50 and 51, hydraulic pump 100, spool 110, and controller 150 are mounted to base 21. Base 21 can be omitted, if desired, and the various components of vehicle arresting device 20 mounted directly to pursuit vehicle 140. As a matter of example, supports 50 and 51 may be mounted directly to pursuit vehicle, such as to its chassis or frame, its front bumper, etc.

Various further changes and modifications to the embodiments herein chosen for purposes of illustration will readily occur to those skilled in the art. To the extent that such modifications and variations do not depart from the spirit of the invention, they are intended to be included within the scope thereof.

The invention claimed is:

1. A vehicle-arresting method, comprising:
   providing a pursuit vehicle pursuing a pursued vehicle;
   the pursuit vehicle having an arresting device comprising an elongate flexible member suspended between opposed first and second supports mounted to the vehicle;
   the pursued vehicle having a rear end and a rotating rear wheel mounted to an axle proximate the rear end;
   the pursuit vehicle approaching the rear end of the pursued vehicle advancing the vehicle-arresting apparatus toward the rear end of the pursued vehicle bringing the elongate flexible member suspended between the opposed first and second supports into engagement with the rotating rear wheel of the pursued vehicle;
   the rotating rear wheel of the pursued vehicle acting on the elongate flexible member suspended between the opposed first and second supports drawing the elongate flexible member around the rotating rear wheel of the pursued vehicle looping the elongate flexible member suspended between the opposed first and second supports around the axle capturing the pursued vehicle by the pursuit vehicle.

2. The vehicle-arresting method according to claim 1, further comprising the pursuit vehicle slowing to a stop bringing the pursued vehicle captured by the pursuit vehicle to a stop.

3. The vehicle-arresting method according to claim 2, further comprising detaching the elongate flexible member from the axle of the pursued vehicle.

4. The vehicle-arresting method according to claim 3, wherein the step of detaching the elongate flexible member from the axle of the pursued vehicle further comprises unlooping the elongate flexible member from the axle of the pursued vehicle.

5. A vehicle-arresting method, comprising:
   providing a pursuit vehicle pursuing a pursued vehicle;
   the pursuit vehicle having an arresting device comprising an elongate flexible member fashioned with tire-piercing elements suspended between opposed first and second supports mounted to the vehicle;
   the pursued vehicle having a rear end, and a rotating rear wheel, including a rear tire, mounted to an axle proximate to the rear end;
   the pursuit vehicle approaching the rear end of the pursued vehicle advancing the vehicle-arresting apparatus toward the rear end of the pursued vehicle bringing the elongate flexible member suspended between the opposed first and second supports into engagement with the rear tire of the rotating rear wheel of the pursued vehicle;
   the rear tire of the rotating rear wheel of the pursued vehicle acting on the elongate flexible member suspended between the opposed first and second supports drawing the elongate flexible member around the rotating rear wheel of the pursued vehicle, the rear wheel rolling over the elongate flexible member puncturing the rear tire with at least one of the tire-piercing elements fashioned with the elongate flexible member to arrest the pursued vehicle.

6. The vehicle-arresting method according to claim 5, further comprising the rear tire of the rotating rear wheel of the pursued vehicle acting on the elongate flexible member suspended between the opposed first and second supports drawing the elongate flexible member around the rotating rear wheel of the pursued vehicle looping the elongate flexible member suspended between the opposed first and second supports around the axle capturing the pursued vehicle by the pursuit vehicle.

7. The vehicle-arresting method according to claim 6, further comprising the pursuit vehicle slowing to a stop bringing the pursued vehicle captured by the pursuit vehicle to a stop.

8. The vehicle-arresting method according to claim 7, further comprising detaching the elongate flexible member from the axle of the pursued vehicle.

9. The vehicle-arresting method according to claim 8, wherein the step of detaching the elongate flexible member from the axle of the pursued vehicle further comprises unlooping the elongate flexible member from the axle of the pursued vehicle.

10. A vehicle-arresting method, comprising:
   providing a pursuit vehicle pursuing a pursued vehicle;
   the pursuit vehicle having an arresting device comprising an elongate flexible member carried by opposed first and second supports movable between a stored position of the elongate flexible member toward the pursuit vehicle and a deployed position of the elongate flexible member away from the pursuit vehicle suspended between the opposed first and second supports;

the pursued vehicle having a rear end, and a rotating rear wheel mounted to an axle proximate to the rear end;

moving the opposed first and second supports into the deployed position of the elongate flexible member and the pursuit vehicle approaching the rear end of the pursued vehicle advancing the vehicle-arresting apparatus toward the rear end of the pursued vehicle bringing the elongate flexible member suspended between the opposed first and second supports into engagement with the rotating rear wheel of the pursued vehicle;

the rotating rear wheel of the pursued vehicle acting on the elongate flexible member suspended between the opposed first and second supports drawing the elongate flexible member around the rotating rear wheel of the pursued vehicle looping the elongate flexible member suspended between the opposed first and second supports around the axle capturing the pursued vehicle by the pursuit vehicle.

11. The vehicle-arresting method according to claim 10, further comprising the pursuit vehicle slowing to a stop bringing the pursued vehicle captured by the pursuit vehicle to a stop.

12. The vehicle-arresting method according to claim 11, further comprising detaching the elongate flexible member from the axle of the pursued vehicle.

13. The vehicle-arresting method according to claim 12, wherein the step of detaching the elongate flexible member from the axle of the pursued vehicle further comprises unlooping the elongate flexible member from the axle of the pursued vehicle.

* * * * *